United States Patent [19]

Naganawa et al.

[11] Patent Number: 4,559,915
[45] Date of Patent: Dec. 24, 1985

[54] METHOD OF CONTROLLING AIR-FUEL RATIO AND IGNITION TIMING IN INTERNAL COMBUSTION ENGINE AND APPARATUS THEREFOR

[75] Inventors: Tadahisa Naganawa; Yoshihiko Matsuda, both of Toyota, Japan

[73] Assignee: Toyota Jidosha Kabushiki Kaisha, Toyota, Japan

[21] Appl. No.: 590,053

[22] Filed: Mar. 15, 1984

[30] Foreign Application Priority Data

Apr. 8, 1983 [JP] Japan ................................ 58-62816

[51] Int. Cl.$^4$ .............................................. F02P 5/04
[52] U.S. Cl. ...................................... 123/406; 123/418
[58] Field of Search ............... 123/406, 415, 416, 417, 123/418, 478, 480

[56] References Cited

U.S. PATENT DOCUMENTS 4,436,072  3/1984  Suzuki et al. ...................... 123/418
4,446,832  5/1984  Matsumura et al. ................ 123/418

FOREIGN PATENT DOCUMENTS 0110564  9/1981  Japan ................................. 123/406

Primary Examiner—Raymond A. Nelli
Attorney, Agent, or Firm—Cushman, Darby & Cushman

[57] ABSTRACT

In a steady running condition of a vehicle, an air-fuel ratio is controlled to be equalized in value to a target air-fuel ratio leaner than a stoichiometric air-fuel ratio and an ignition timing is controlled to be equalized in value to a required ignition timing, so that a fuel consumption can be improved.

1 Claim, 8 Drawing Figures

METHOD OF CONTROLLING AIR-FUEL RATIO AND IGNITION TIMING IN INTERNAL COMBUSTION ENGINE AND APPARATUS THEREFOR

BACKGROUND OF THE INVENTION

1. Field of the Invention

This invention relates to a method and an apparatus for controlling an air-fuel ratio and an ignition timing in an internal combustion engine, and more particularly to a method of and the apparatus for controlling an air-fuel ratio and an ignition timing in a steady running condition of spark-ignition engine.

2. Description of the Prior Art

In the spark-ignition engines in general, there has been used a three-way catalytic converter for purifying carbon monoxide, hydrocarbon and nitric oxide in the exhaust gas. To improve the rate of purification of this three-way catalytic converter, a fuel injection valve or a fuel injection nozzle is on-off controlled by a basic fuel injection pulse-width based on an engine rotational speed and an engine load (an intake pipe pressure or an intake air flowrate per turn of the engine), so that an air-fuel ratio of an air-fuel mixture can be controlled to be in the vicinity of a stoichiometric air-fuel ratio. Since a required ignition timing of the engine is varied depending upon the engine rotational speed and the engine load, the ignition timing is controlled so that the required ignition timing can be obtained depending upon the engine rotational speed and engine load.

In consequence, during the normal running condition excluding the case of a high load, the air-fuel ratio is controlled to be in the vicinity of the stoichiometric air-fuel ratio irrespective of an acceleration, a constant speed and a deceleration, and hence, the air-fuel ratio is not controlled to be one where the best fuel consumption rate can be attained in the conditions of running at a substantially constant speed.

SUMMARY OF THE INVENTION

The present invention has as its object the provision of method of and apparatus for controlling an air-fuel ratio and an ignition timing in an internal combustion engine, in which the air-fuel ratio is made leaner and the ignition timing is corrected to improve the fuel consumption during steady running condition.

To this end, the arrangement according to a first aspect of the present invention comprises; a first step of judging whether or not a vehicle is in a steady running condition; a second step of gradually controlling the air-fuel ratio every predetermined period of time so that the air-fuel ratio can coincide with a target air-fuel ratio, which has been predetermined to a value leaner than the stoichiometric air-fuel ratio, in accordance with an engine operating condition, when it is judged that the vehicle is in the steady running condition; and a third step of gradually controlling the ignition timing every predetermined period of time so that the ignition timing can coincide with a required ignition timing corresponding to the aforesaid target air-fuel ratio, when it is judged that the vehicle is in the steady running condition.

More specifically, for the purpose of improving the fuel comsumption, the target air-fuel ratio leaner than the stoichiometric air-fuel ratio is predetermined in accordance with the engine operating condition, during the predetermined running condition where an engine load is within a predetermined range of value and a variation in the engine load is at a predetermined value or less, the air-fuel ratio is gradually approached to the target air-fuel ratio every predetermined period of time in accordance with the engine operating condition, and the ignition timing is gradually approached to the required ignition timing corresponding to the target air-fuel ratio every predetermined period of time.

The arrangement according to a second aspect of the present invention comprises: fuel injection control means for controlling the on-off timing a fuel injection valve in accordance with fuel injection pulse-width (fuel injection time duration) corresponding to the engine rotational speed and engine load; ignition timing control means for controlling the on-off timing of an igniter in accordance with the spark advance angle corresponding to the engine rotational speed and engine load; memory means for previously storing the target air-fuel ratio leaner than the stoichiometric air-fuel ratio in accordance with the engine operating condition; judging means for judging whether or not the engine load is within the predetermined range of value and the variation in the engine load is at the predetermined value or less, based on a detected result from load detecting means; fuel injection correcting means for correcting the on-off timing of the fuel injection valve so that the air-fuel ratio gradually approaches the target air-fuel ratio obtained through the result of detection from engine operating condition detecting means every predetermined period of time, based on the result of judgement from the judging means; and ignition timing correcting means for correcting the on-off timing of the igniter so that the igniton timing gradually approaches the required ignition timing corresponding to the target air-fuel ratio obtained in such a manner as aforesaid every predetermined period of time, based on the result of judgement from the judging means.

The above-described arrangement of the present invention is advantageous in that, during the predetermined vehicle running condition, the air-fuel ratio is gradually controlled to the target air-fuel ratio aiming at improvements in the fuel consumption and the ignition timing is controlled to the required ignition timing corresponding to this air-fuel ratio, so that the fuel consumption can be improved without hampering the controllability.

DETAILED DESCRIPTION OF THE INVENTION

Figure 1:
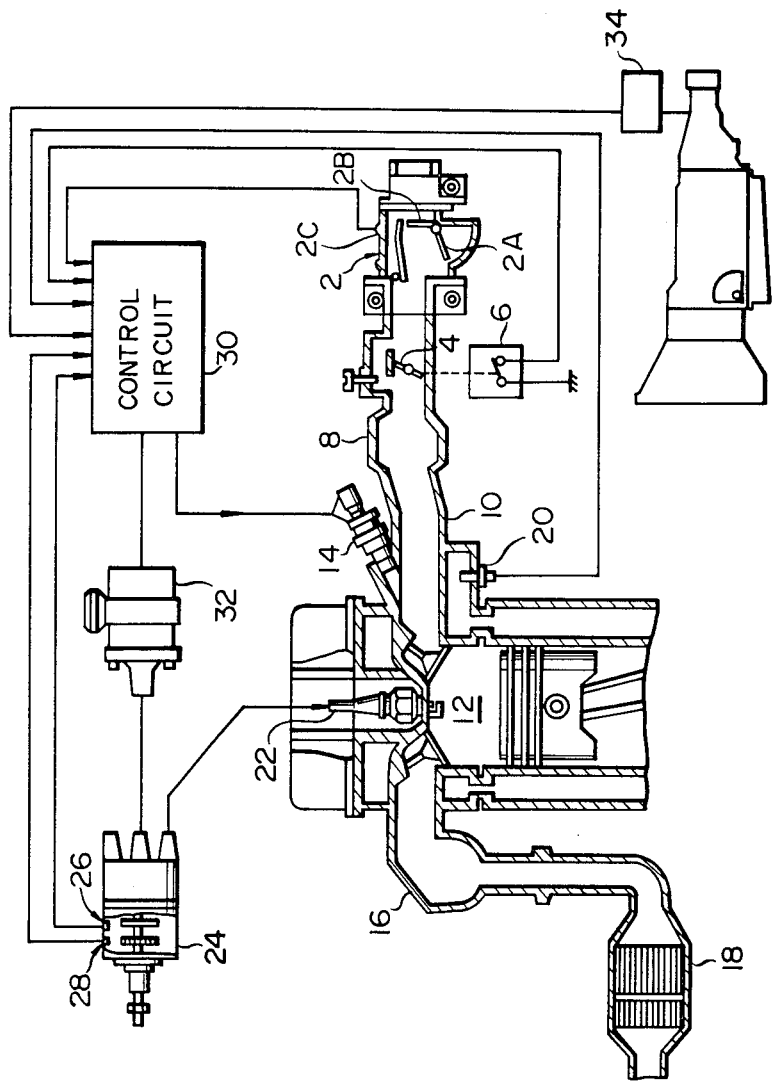
FIG. 1 is a shematic diagram showing an example of the engine, to which the present invention is applied.

Detailed description will hereunder be given of one embodiment of the present invention. FIG. 1 is the schematic diagram of the spark-timing engine, to which the present invention is applied. An air flow meter 2 is provided downstream of an air cleaner, not shown. This air flow meter 2 comprises a compensation plate 2A rotatably provided in a damping chamber, a measuring plate 2B rotatable in association with the compensation plate 2A and a potentiometer 2C for converting the rotation of the measuring plate 2B into a voltage. A throttle valve 4 is provided downstream of the air flow meter 2. This throttle valve 4 is mounted thereto with an idle switch 6 movable in association with the throttle valve 4 and adapted to be turned on when the throttle valve is fully closed, to be turned off when the throttle valve is opened. Disposed downstream of the throttle valve 4 is a surge tank 8 which is communicated with a combustion chamber 12 through an intake manifold 10. This intake manifold 10 is mounted thereto with fuel injection valves 14 for respective cylinders. The combustion chamber 12 is communicated with a catalytic converter 18 filled up with a three-way catalyst through an exhaust manifold 16. Furthermore, an engine block is secured thereto with a coolant temperature sensor 20 for detecting coolant temperature of the engine to output a coolant temperature signal. Projected into the combustion chamber of the engine is the forward end of a spark plug 22 connected to a distributor 24. The distributor 24 is provided therein with a cylinder discriminating sensor 26 and an engine speed sensor 28, each of which comprises a pickup fixed to a distributor housing and a signal rotor fixed to a distributor shaft. In a six-cylinder engine for example, the cylinder discriminating sensor 26 outputs a cylinder discriminating signal to a control circuit 30 comprising a microcomputer or the like at every 720° CA (crank angle) for example, and the engine speed sensor 28 outputs an engine signal to the control circuit at every 30° CA. The distributor 24 is connected to an igniter 32. In addition, designated at 34 is a vehicle speed sensor for detecting the rotation of a transmission output shaft to output a vehicle speed signal.

Figure 2:
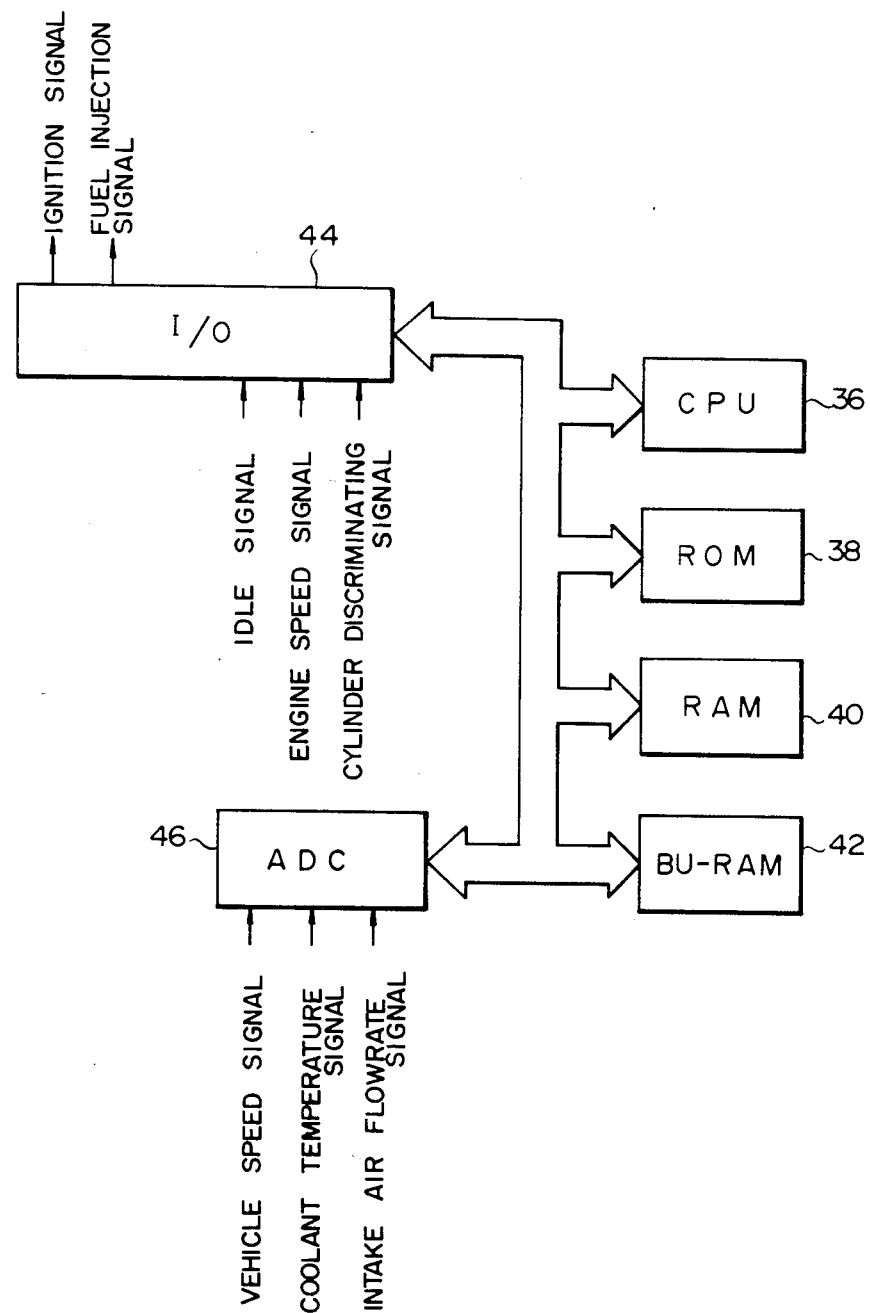
FIG. 2 is a block diagram showing the control circuit of FIG. 1.
Figure 3:
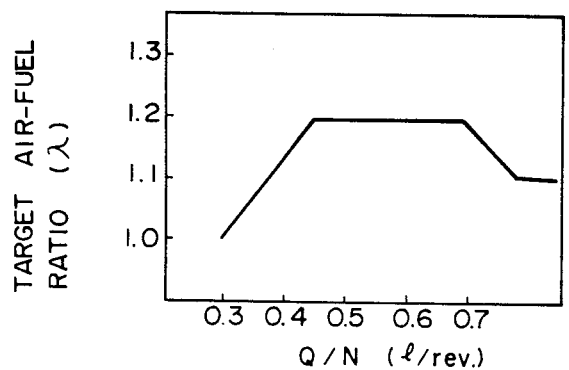
FIG. 3 is a chart showing an example of the target air-fuel ratio.
Figure 4:
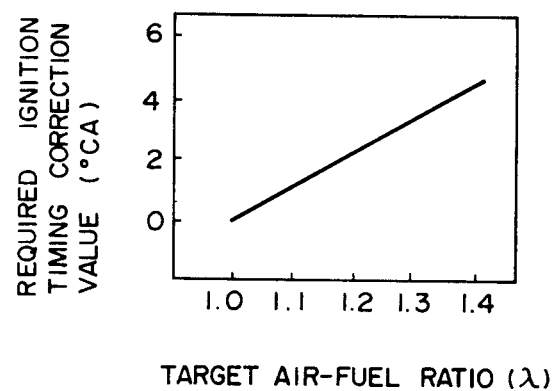
FIG. 4 is a chart showing an example of the required ignition timing correction value.

As shown in FIG. 2, the control circuit 30 includes a central processing unit (CPU) 36, a read only memory (ROM) 38, a random access memory (RAM) 40, a backup RAM (BU-RAM) 42, an input/output port (I/O) 44, an analogue/digital converter (ADC) 46 and buses such as a data bus and a control bus, which connect the above-described components to one another. Inputted to the I/O 44 are the cylinder discriminating signal, the engine speed signal and an idle signal from the idle switch 6. The I/O 44 outputs a fuel injection pulse signal for controlling the on-off timing of the fuel injection valve 14 and an ignition pulse signal for controlling the on-off timing of the igniter 32 through drive circuits, not shown, respectively. Furthermore, an intake air flowrate signal from air flow meter, the vehicle speed signal and the coolant temperature signal are inputted to the ADC 46 and converted into digital signals. The ROM 38 previously stores therein a map of the basic spark advance angles represented by the engine speeds and the intake air flowrates per turn of the engine, a map of the air-fuel ratios represented by the intake air flowrate per turn of the engine and the target air-fuel ratios as shown in FIG. 3, a map of the ignition timing correction values represented by the target air-fuel ratios and the required ignition timing correction values as shown in FIG. 4, a program of seeking the fuel injection flowrates from the intake air flowrates per turn of the engine and the like.

The map of the air-fuel ratios is determined such that the target air-fuel ratio indicated by an excess air rate λ is increased with the increase of the intake air flowrate per turn of the engine. Furthermore, the map of the ignition timing correction values is determined such that the correction value is increased with the increase of the target air-fuel ratio indicated by the excess air rate λ.

Figure 5:
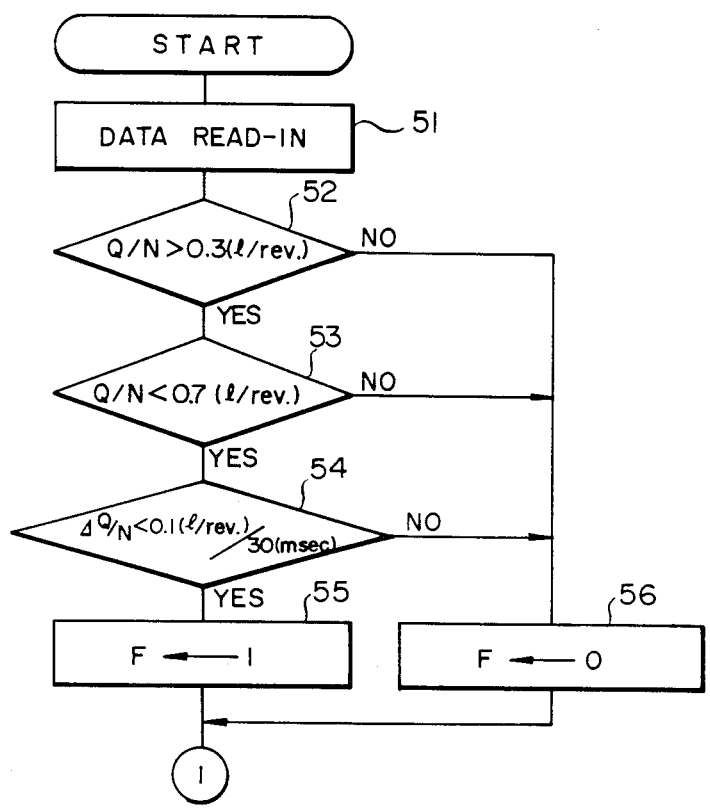
FIG. 5 is a flow chart showing the routine of judging the air-fuel ratio correction and the ignition timing correction.

Description will hereunder be given of the routines of this embodiment. The following routines will be described by use of the numerical values not affecting this embodiment, however, these numerical values need not necessarily be limited thereto. FIG. 5 shows a first routine of judging whether the air-fuel ratio and the ignition timing should be corrected or not. In Step 51, an intake air flowrate per turn of the engine or a load Q/N and a variation of load ΔQ/N, both of which are sought from an intake air flowrate and an engine speed N, are read out of the RAM and correction values for the target air-fuel ratio and the ignition timing are sought from the map of the ROM by the interpolation method. In Steps 52 and 53, it is judged whether or not the load Q/N exceeds 0.3 (l/rev.) and is less than 0.7 (l/rev.). When the load Q/N exceeds 0.3 (l/rev.) and is less than 0.7 (l/rev.), i.e., the load is within the range of the predetermined value, then in Step 54, it is judged whether or not the variation of load ΔQ/N is less than 0.1 (l/rev.)/30 (msec), that is, less than the predetermined value. When the load Q/N is within the range of the predetermined value and the variation of load ΔQ/N is less than the predetermined value, it is regarded that the predetermined running condition are present, and Step 55, a flag F is set which permits the corrections of the air-fuel ratio and the ignition timing. On the other hand, when it is not regarded that the predetermined running condition are not present, the flag F is reset in Step 56.

Figure 6:
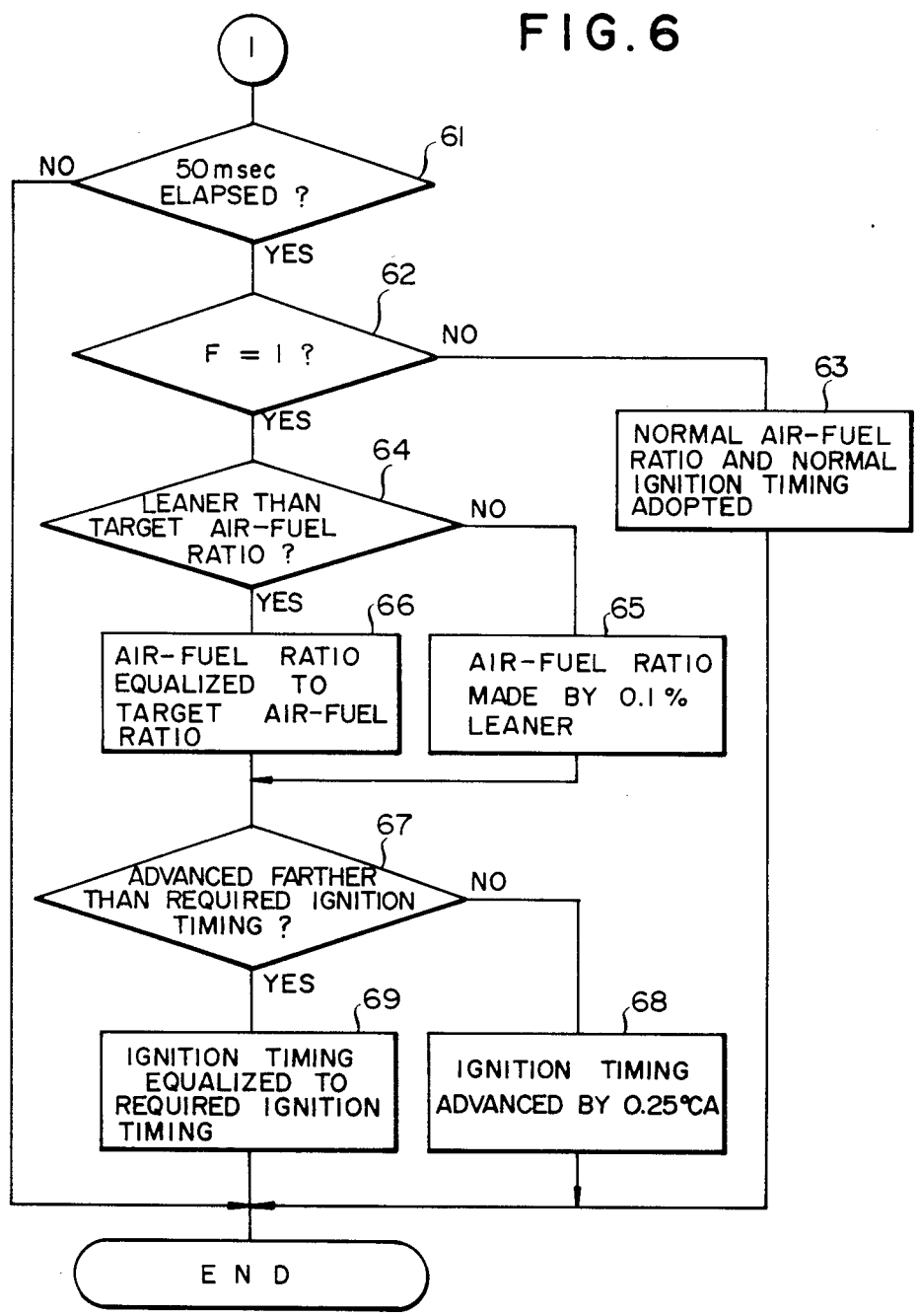
FIG. 6 is a flow chart showing the routine of controlling the air-fuel ratio and the ignition timing.

FIG. 6 shows the routine of correcting the air-fuel ratio and the ignition timing. In Step 61, it is judged whether or not 50 (msec) has elapsed on the basis of the counted value of a counter in a register portion of the CPU, that is, the predetermined time period has elapsed. When the predetermined time period has not elapsed, the process goes forward to the subsequent routine, and, when the predetermined time period has elapsed, then in Step 62, it is judged whether or not the flag F permitting the corrections in Step 62 is set. When the flag F is reset, then in Step 63, the air-fuel ratio and the ignition timing, which are regarded as normal values, are controlled. More specifically, during the fuel injection time duration sought from the engine speed N and the load Q/N, the fuel injection valve is opened, and the igniter is on-off operated so that the ignition can be effected by the basic spark advance angle sought from the map of the ROM by the interpolation method.

On the other hand, when the flag F is set, then in Step 64, it is judged whether or not the air-fuel ratio at present is leaner than the target air-fuel ratio. When richer, then in Step 65, the air-fuel ratio at present is decreased 0.1%, i.e., made leaner by a predetermined value, and the routine proceeds to Step 67. Furthermore, when the air-fuel ratio at present is leaner than the target air-fuel ratio, then, in Step 66, the air-fuel ratio is equalized to the target air-fuel ratio. As the result, the air-fuel ratio is controlled to approach the target air-fuel ratio by 0.1% per 50 (msec). Description will not be given of this by way of an example when the fuel injection pulse-width (fuel injection time duration) is controlled to thereby control the air-fuel ratio. Since the fuel injection pulse-width Tp is longer than the fuel injection pulse-width Tpo corresponding to the target air-fuel ratio at the initial stage where the predetermined running condition commence, in Step 65 the fuel injection pulse-width Tp is shortened by 0.1%. Until the fuel injection pulse-width Tp is equalized to the fuel injection pulse-width Tpo, the fuel injection pulse-width Tp is shortened by 0.1% per 50 (msec) as described above.

In Step 67, it is judged whether or not the ignition timing at present is farther advanced than the required ignition timing sought by adding a correction value to the basic spark advance angle, i.e., the required ignition timing corresponding to the corrected air-fuel ratio. When the ignition timing at present retards behind the required ignition timing, then, in Step 68, the ignition timing at present is advanced by 0.25° CA, i.e., a predetermined value. Furthermore, as the result of this advance, if the ignition timing at present is farther advanced than the required ignition timing, in Step 69 the ignition timing is equalized in value to the required ignition timing. As the result, the igniter is on-off controlled so that the ignition timing will be advanced by 0.25° CA per 50 (msec) until the ignition timing is equalized in value to the required ignition timing.

Figure 7:
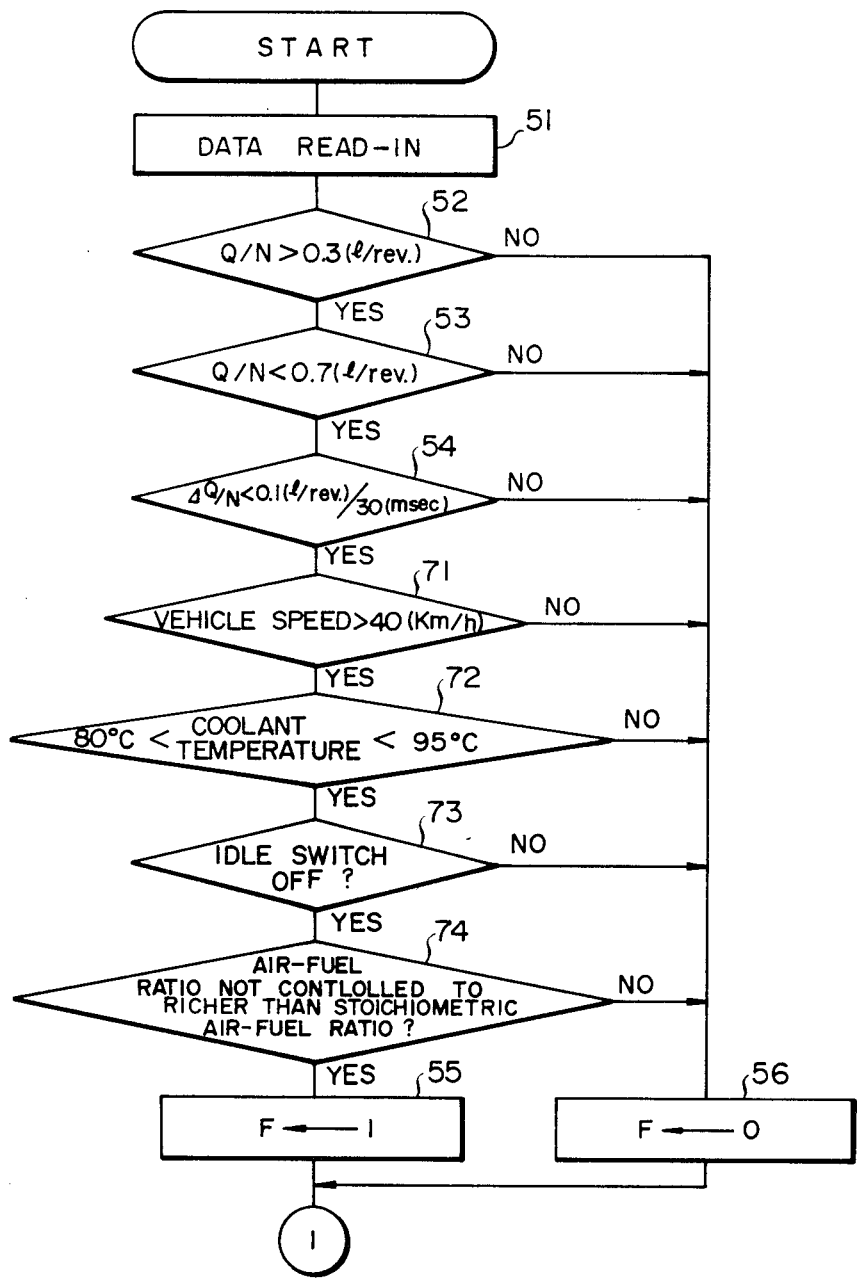
FIG. 7 is a flow chart showing another example of the routine of the air-fuel ratio correction and the ignition timing correction.

FIG. 7 shows a second routine of judging whether or not the corrections of the air-fuel ratio and the ignition timing should be made. Additionally, same reference numerals as shown in FIG. 5 are used in FIG. 7 to designate same or similar parts, so that detailed description will be omitted. To detect the predetermined running condition, in this routine, there are further judged the vehicle speed, coolant temperature and the conditions of throttle valve and the controlled conditions of the air-fuel ratio. In Step 71, it is judged whether or not the vehicle speed exceeds 40 (Km/h) based on the vehicle speed signal. In Step 72, it is judged whether or not the engine coolant temperature is within the range of 80° C.–95° C. In Step 73, it is judged whether or not the idle switch is off, i.e., the throttle valve is opened. In Step 74, it is judged whether the air-fuel ratio is not controlled so as to be richer than the stoichiometric air-fuel ratio by the fuel increase effected during the high load. When the requirements in connection with the load as shown in FIG. 5 and the above-described requirements are satisfied, the correction flag F is set. In addition to the above-described requirements, it may be judged whether or not a constant speed running device for holding the vehicle speed at a predetermined value is in operation.

Figure 8:
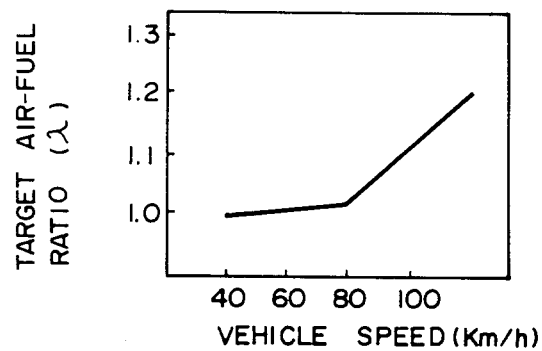
FIG. 8 is a chart showing another example of the target air-fuel ratio.

FIG. 8 shows an example of another map of the target air-fuel ratio. The target air-fuel ratio in this map is determined such that the excess air rate λ increased, i.e., the air-fuel ratio becomes leaner, with the increase of the vehicle speed.

In addition, in the foregoing, there has been explained the example where the air-fuel ratio and the ignition timing are controlled by the intake air flowrate and the engine speed, however, the present invention is applicable to an engine in which the air-fuel ratio and the ignition timing are controlled by the intake pipe pressure and the engine rotational speed. Furthermore, there has been explained the example where the required ignition timing is obtained from the correction value for the ignition timing, however, the required ignition timing itself can be stored in the form of a map.

What is claimed is:

1. Apparatus for controlling an air-fuel ratio and an ignition timing in an internal combustion engine, comprising:

fuel injection control means for controlling an on-off timing of a fuel injection valve in accordance with fuel injection time duration corresponding to the engine rotational speed and engine load;

ignition timing control means for controlling an on-off timing of an igniter in accordance with a spark advance angle corresponding to the engine rotational speed and engine load;

memory means for storing a target air-fuel ratio which is leaner than a stoichiometric air-fuel ratio, a stoichiometeric air-fuel ratio and an air-fuel ratio which is richer than the stoichiometric air-fuel ratio;

determining means for determining whether or not the engine load is within a predetermined range and the variation in the engine load is also within a predetermined range;

fuel injection correcting means for correcting the on-off timing of the fuel injection valve so that the air-fuel ratio approaches the target air-fuel ratio when said determining means determines that the engine load is within a predetermined range; and ignition timing correcting means for correcting the on-off timing of the igniter so that the ignition timing approaches the required ignition timing corresponding to said target air-fuel ratio when said determining means determines that the engine load is within a predetermined range and the variation in the engine load is within a predetermined range.

* * * * *